United States Patent
Rai et al.

(10) Patent No.: US 6,469,747 B1
(45) Date of Patent: Oct. 22, 2002

(54) PARABOLIC MIXER FOR VIDEO SIGNALS

(75) Inventors: Sanjay Devappa Rai; Joel D. Gibson, both of Ft. Lauderdale, FL (US)

(73) Assignee: Da Vinco Systems, Inc., Coral Springs, FL (US)

( * ) Notice: Subject to any disclaimer, the term of this patent is extended or adjusted under 35 U.S.C. 154(b) by 0 days.

(21) Appl. No.: 09/389,150

(22) Filed: Sep. 2, 1999

(51) Int. Cl.⁷ ............................. H04N 9/74; H04N 9/64
(52) U.S. Cl. .................. 348/584; 348/598; 348/650
(58) Field of Search ........................... 348/584, 585, 348/598, 599, 650, 645, 649, 588, 687; H04N 9/74, 9/76, 9/64, 9/68, 5/57

(56) References Cited

U.S. PATENT DOCUMENTS

| | | | | |
|---|---|---|---|---|
| 4,117,512 A | * | 9/1978 | Miyake | 348/588 |
| 4,710,800 A | | 12/1987 | Fearing et al. | 358/22 |
| 4,782,384 A | | 11/1988 | Tucker et al. | 358/22 |
| 4,908,874 A | | 3/1990 | Gabriel | 382/41 |
| 4,952,051 A | | 8/1990 | Lovell et al. | 352/87 |
| 4,954,881 A | | 9/1990 | Kaye | 358/22 |
| 5,050,984 A | | 9/1991 | Geshwind | 352/38 |
| 5,051,928 A | | 9/1991 | Gruters | 364/521 |
| 5,202,762 A | * | 4/1993 | Fellinger | 348/615 |
| 5,252,953 A | | 10/1993 | Sandrew et al. | 345/122 |
| 5,327,501 A | | 7/1994 | Kato et al. | 382/44 |
| 5,450,500 A | | 9/1995 | Brett | 382/162 |
| 5,495,540 A | | 2/1996 | Frankot et al. | 382/294 |
| 5,506,946 A | | 4/1996 | Bar et al. | 395/131 |
| 5,506,949 A | | 4/1996 | Perrin | 395/152 |
| 5,530,774 A | | 6/1996 | Fogel | 382/154 |
| 5,850,471 A | | 12/1998 | Brett | 382/162 |
| 5,874,988 A | | 2/1999 | Gu | 348/97 |

FOREIGN PATENT DOCUMENTS

| | | | | |
|---|---|---|---|---|
| EP | 0 488 974 A2 | 6/1992 | ............ | H04N/1/00 |
| EP | 0 583 898 A2 | 2/1994 | ............ | G06F/15/68 |
| EP | 0 609 567 A2 | 8/1994 | ............ | G06F/15/68 |
| WO | WO 87.06419 | 10/1987 | | |

OTHER PUBLICATIONS

The Renaissance 8:8:8 User's Guide (Version 1.7, Sep. 1, 1996), Chapter 5.

The Da Vinci Renaissance 8:8:8 User's Guide (Version 1.7, Sep. 1, 1996), Chapter 6.

Understanding Color Maps, Picture Publisher 5.0 User's Guide, Web Edition, 1996 by Micrografx, Inc.

Adobe Photoshop User Guide (Version 4.0, pp. 146–151).

Matsuyama et al., Multiply Descent Cost Competitive Learning as an Aid for Multimedia Image Processing, Proceeding of 1993 International Joint Conference on Neural Networks, Oct. 28, 1993.

* cited by examiner

*Primary Examiner*—Sherrie Hsia
(74) *Attorney, Agent, or Firm*—Morris, Manning & Martin, LLP

(57) ABSTRACT

A video signal mixer with a parabolic signal mixing function, especially useful in scene-by-scene color correction systems and "blue screen" video masking applications. The mixer effects mixing two independent signal sources while smoothly controlling the rate of change during mixing. An input stage receives a first video signal and a second video signal. The mixing circuit mixes the first video signal with the second video signal based on a predetermined parabolic function. An aperture signal circuit in the mixer allows a degree of operator control over the parabolic function. An output stage provides a parabolized output signal. The output signal, which comprises the mixture of the first video signal and the second video signal, eliminates discontinuities in regions of the signal which would otherwise produce discontinuities in prior art types of video signal mixers.

14 Claims, 8 Drawing Sheets

ADDITIVE MIXER

OUTPUT WITH PRIOR ART ADDITIVE MIXER

NONADDITIVE (NAM) MIXER

T WITH PRIOR ART NONADDITIVE (NAM) MIXER

MULTIPLICATIVE MIXER

F1 * F2 OUTPUT WITH
PRIOR ART MULTIPLICATIVE (NAM) MIXER

*FIG. 10* PARABOLIC MIXER

OUTPUT WITH PARABOLIC MIXER

PARABOLIC MIXER FOR VIDEO SIGNALS

TECHNICAL FIELD

The present invention relates generally to image processing, and more particularly relates to a system and methods for mixing two independent signal sources while smoothly controlling the rate of change during mixing, especially useful in scene-by-scene color correction systems, matte mixing, and "blue screen" video masking applications.

BACKGROUND OF THE INVENTION

Video signal color correction systems for creating, enhancing, compressing, filtering, or otherwise modifying characteristics of video images are known in the art. Systems for modifying video signals are used for creating special effects as well as for correcting video images to compensate for variations in cameras, film, lighting conditions, etc.

Video image processing systems are especially employed in post-production color correction systems for motion picture film and/or video tape color corrections, and typically operate on a scene-by-scene basis. A "scene" is a sequential collection of images, often shot from the same camera, having the same viewpoint, composed in a certain way, etc. An operator using a typical post-production color correction system observes a target frame of a scene on a video monitor, adjusts the color or other parameters of the frame until it is aesthetically satisfactory, and stores color correction parameters in system memory. The color correction system preferably automates the application of the stored color correction parameters to the other frames of the scene.

In many applications, color correction is applied to selected regions of a video image. Various methods are employed to isolate color regions or geometric regions for receiving color corrections. A color correction system that isolates regions by color or hue is described in U.S. Pat. No. 6,337,692 entitled "Primary Color Manipulation Using Hue, Saturation, Luminance and Area Isolation." The system described in this patent isolates one or more color correction regions through operations performed in the hue domain. The regions for receiving color correction or modifications are defined through "qualification". Specifically, parameters of hue qualification, saturation qualification, luminance qualification, and an optional alpha filter are combined to define an alpha qualification function that isolates a region or "hue sector" for color correction. The alpha qualification function may have a shape in the hue domain that ramps or softens the applied color correction by generating a gradual or fractional transition towards the edges of the corrected hue sector.

It is also known in the art to define geometric regions for receiving color corrections. For example, U.S. Pat. No. 6,097,853 entitled "User Definable Windows for Selecting Image Processing Regions," describes a system where a user of an image processing system such as a scene by scene color corrector can define a window or region for purposes of applying image processing only to selected regions of an image. A geometric region can consist of a square, rectangle, triangle, or a composite geometric region defined using tools.

Color corrections can be effected for regions inside a defined window or regions outside the defined window. Furthermore, separate sets of color corrections can be defined for regions inside the window and outside the window. Utilization of windows for defining regions for receiving color correction is also called "masking", and the window is often called a "mask" or "matte". Masking can be effected both with color region isolation or with geometric windows.

A matte or mask can be set up so that the regions inside the matte receive one set of color corrections, while regions outside the matte receive a different and second set of color corrections. As in the case of detecting a hue region for color correction with qualification, the boundaries of a window (or mask or matte) are often softened electronically with a gradual fractional application of color correction so that the transition between regions that receive different color corrections is not as noticeable. Stated in other words, color corrections in a transition region are gradually diminished or increased, as appropriate, between the inside and the outside of the matte.

The basic color masking technique is often employed in "blue screen" applications to create special effects. A "blue screen" application is when a camera shoots a scene with an actor positioned before a blue screen, with the system creating a "mask" defined by the blue color. It is known in the video and film arts to shoot an actor in front of a having a predetermined blue color to derive a first video signal, provide a second video signal containing a background image against which the actor is to be superimposed, and to mix the first video signal with the blue screen with the second video signal. A color correction system detects regions of the first video signal containing the predetermined blue hue and adds or mixes in the second video signal in such detected regions. The effect is an overlay of the actor over the scene represented in the second video signal. In this manner, the actor can be made to appear superimposed over a different and independent image, e.g. a weather map, a scene from outer space, flying over the ocean, etc.

The blue screen technique is also known as "keying", in the sense that the first video signal with the blue region serves as a key, and the second video signal provides a signal source that is substituted for the predetermined values of blue as detected in the circuit. Another term used by those skilled in the art is "matte".

When conducting color correction operations, including keying, matting, and blue screen methods, it is generally necessary to mix two independent video signals to arrive at a combined video signal. In some applications, the two mixed video signals each contain a key or matte. A video signal mixer is usually employed to effect this mixing function.

Refer now to FIG. 1 for an example of mixing a first video signal containing a first key or matte and a second video signal containing a second key or matte. A first video image 12 containing a geometric matte or key 14 with a fractional boundary or transition zone 16 is to mixed with a second video image 20 containing a second matte or key 22 with a second fractional boundary or transition zone 24. The desired result is a third video image 30 where the two mattes 14, 22 are combined.

Assume further that the peripheral edges 16, 24 of the keys 14, 20 are fractionalized, i.e. the boundary between regions of the video image inside the key and outside the key experiences a tapering off of the application of color correction. Color correction applied to regions inside the key gradually tapers to zero in the fractionalized areas. Conversely, color correction applied to regions outside the key (if any) gradually tapers to zero in the fractionalized area.

The video images in FIG. 1 are "windowing" signals in the context of video signal color correction signals. A windowing signal is a gray scale signal in that it goes from white (0) to black (1) with a number of fractional (gray) values in between as it transitions. The fractional values occur in the peripheral edges 16, 24 of the keys 14, 20. A window signal of white (0) would produce a color correction pertaining to an OUT-WINDOW set of color corrections as defined by the user, and a window signal of black (1) would produce an IN-WINDOW set of color corrections at the output. Any fractional window value (between 0 and 1) would produce a mixture of the IN-WINDOW and OUT-WINDOW sets of color corrections.

When mixing mattes that include fractional transition zones or regions, artifacts can occur where there are discontinuities between the fractional values defining the transitions. These discontinuities are most likely to occur in applications where two or more mattes are combined to form a larger composite area, such as shown in FIG. 1 at 32, which is the intersection between the window or matte 14 and the window or matte 22. Relevant portions of the signals that form the combined area 32 are shown in FIG. 1 as input signal F1 and input signal F2.

Various types of video signal mixers are known in the art, but suffer from certain drawbacks. An additive (or subtractive) mixer produces its output by adding or subtracting, as appropriate, the input signals and limiting the output. An additive mixer known in the art is shown in FIG. 2.

If the input signals F1, F2 from the images 12 and 20 respectively in FIG. 1 containing mattes 14 and 22 are mixed with an additive mixer such as shown in FIG. 2, an output such as shown in FIG. 3 is produced. The output shown in FIG. 3 includes noticeable crease lines 35 which result from discontinuities from adding the values in the fractional areas. These discontinuities are undesirable and are noticeable in certain applications.

Another type of video signal mixer that is known in the art is a non-additive mixer or NAM. This type of mixer, as shown in FIG. 4, produces an output signal by comparing the input signals F1 and F2, and producing an output comprising the greater (or lesser) of the two input signals, as appropriate. The output produced by a non-additive mixer for the example of FIG. 1 mixing F1 and F2 is shown in FIG. 5. Note the crease line 35 that results with the use of this type mixer.

FIG. 6 illustrates a multiplicative mixer which produces its output by multiplying the input signals F1, F2. The output of the multiplicative mixer for the example of FIG. 1 and signals F1 and F2 is shown in FIG. 7. A multiplicative mixer also produces crease lines 35 which result from discontinuities in the signal values.

In all of the prior art mixers described above, a visual artifact in the form of a crease line is created at the corners where there is a jump or discontinuity in the rate at which the output changes, resulting from the mathematics of the mixing operation. Color correction changes therefore will change abruptly at such crease lines, and these abrupt changes are often noticeable in the mixed output. Therefore, there is a need for a video signal mixer which does not produce such artifacts and results in smooth mixing of two independent video signal sources.

SUMMARY OF THE INVENTION

The present invention overcomes the disadvantages described above in video signal mixing circuits. Briefly described, the present invention provides a signal mixer for mixing a first video signal with a second video signal while smoothly controlling the rate of change of an output signal. An input stage receives the first video signal and the second video signal. The mixing circuit mixes the first video signal with the second video signal based on a predetermined parabolic function. An output stage provides a "parabolized" output signal, i.e., the output signal is a mixture of the input signals with a parabola fitted between the two signals in transition areas. As a result, the output signal, which comprises the mixture of the first video signal and the second video signal, eliminates discontinuities in regions of the signal which would otherwise produce discontinuities in prior art types of video signal mixers.

More particularly described, the video signal mixer comprises a maximum signal detector for detecting the maximum value of the first video signal or the second video signal, a minimum signal detector for detecting the minimum value of the first video signal or the second video signal, and a circuit for providing a difference signal comprising the difference between the maximum value of the first video signal or the second video signal and the minimum value of the first video signal or the second video signal. An aperture circuit responsive to an aperture signal and to the difference signal provides an aperture varied signal for varying the output signal corresponding to the value of the aperture signal. This effects a degree of operator control over the extent of the parabolization.

The video signal mixer further includes a multiplier circuit for squaring the aperture varied signal, and an adder circuit for adding the squared aperture varied signal to the maximum value of the first video signal or the second video signal. The preferred output stage of the video signal mixer comprises an output multiplexer for selecting either the maximum value of the first video signal or the second video signal or the output of the adder circuit to provide the parabolized output signal.

The present invention further provides a method for mixing a first video signal with a second video signal to provide a parabolized output signal while smoothly controlling the rate of change of the output signal. The disclosed method comprises the steps of detecting the maximum value of the first video signal or the second video signal, and detecting the minimum value of the first video signal or the second video signal. The difference between the maximum value of the first video signal or the second video signal and the minimum value of the first video signal or the second video signal is then determined and provided as a first difference signal. A operator controlled aperture signal is provided for varying the mixer output and effecting a degree of control over the parabola that is fitted between the two input signals. The difference between the aperture signal and the first difference signal is calculated to provide an aperture varied signal. The aperture varied signal is then squared and added to the maximum value of either the first video signal or the second video signal. Finally, either the maximum value of the first video signal or the second video signal or the output of the adding step is selected to provide the parabolized output signal.

With such a construction and methodology, two independent video signal sources may be mixed with a smoothly varied output comprising a mixture of the two signals. The invention is especially advantageous for use when it is necessary to combine video images containing different keys or qualifiers, e.g. when the two separate video images to be mixed have intersecting mattes or keys.

These and other features and advantages of the invention may be more clearly understood and appreciated from a review of the following detailed description of the disclosed embodiment, and by reference to the appended drawings and claims.

DETAILED DESCRIPTION OF THE DISCLOSED EMBODIMENT

Figure 1:
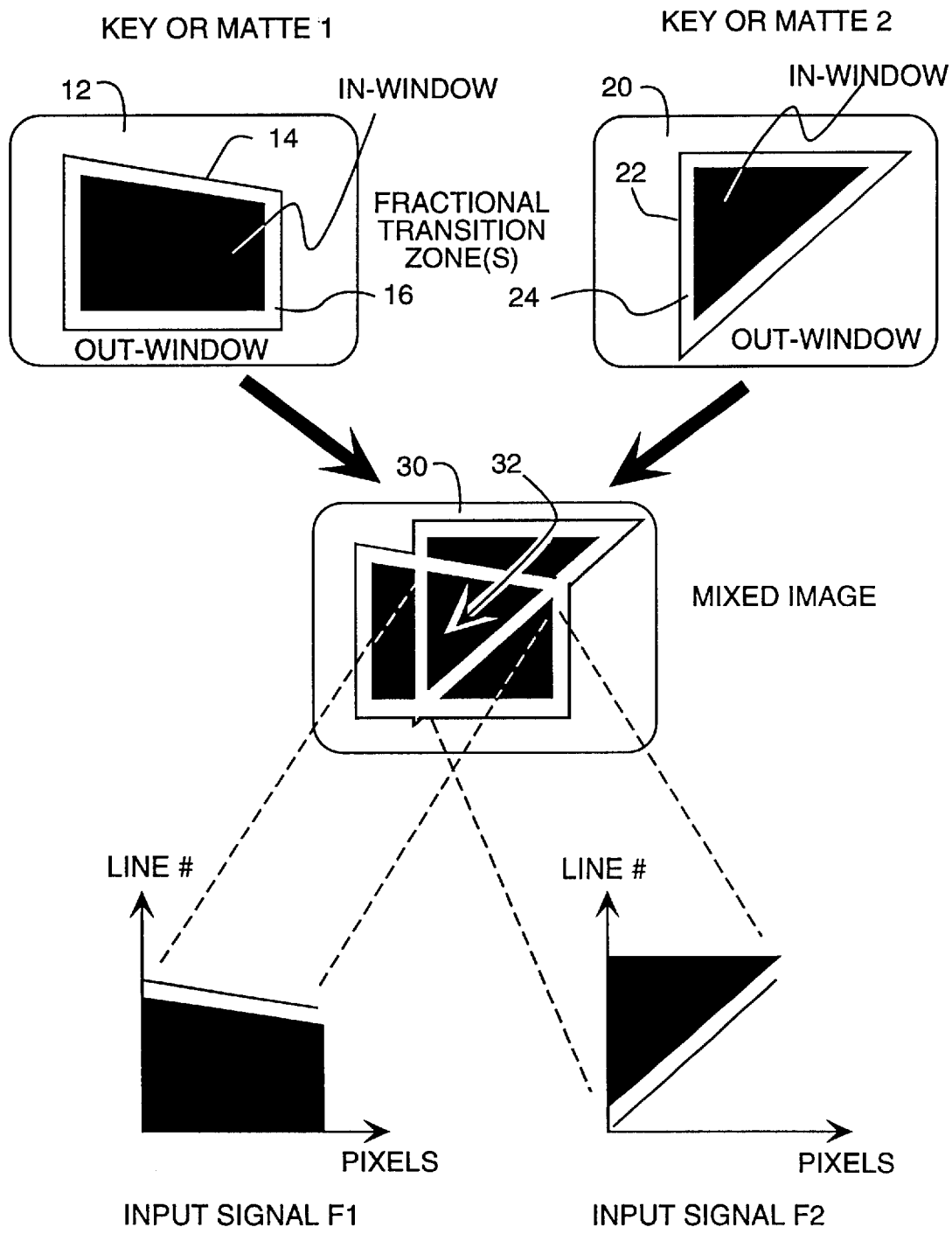
FIG. 1 illustrates two independent video signal sources that include mattes or keys and the resultant combination of the two signals mixed with a video signal mixer.
Figure 2:
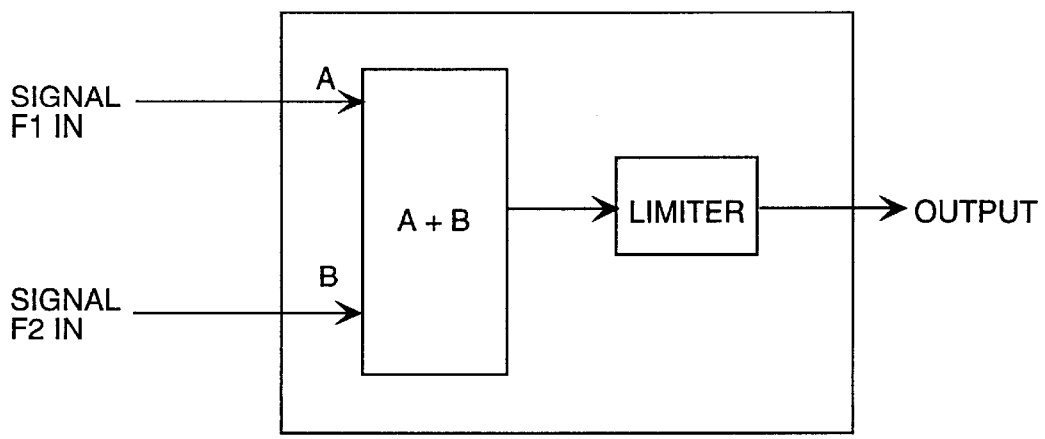
FIG. 2 illustrates a prior art additive (or subtractive) video signal mixer.
Figure 3:
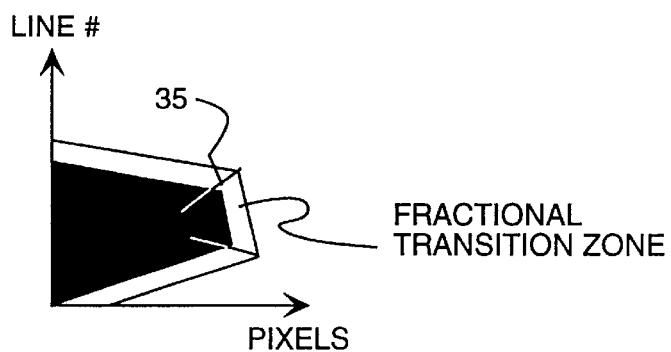
FIG. 3 illustrates the output of the prior art additive mixer with the input signals of FIG. 1.
Figure 4:
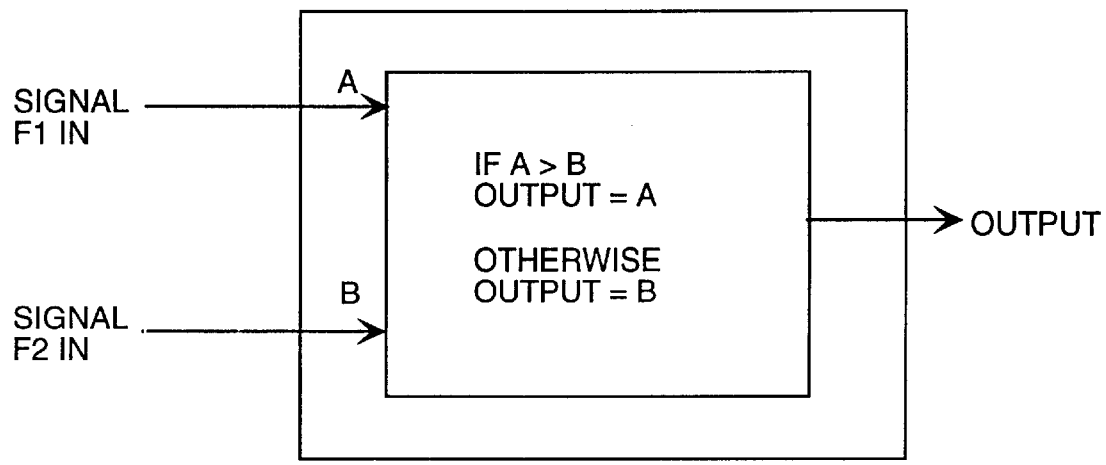
FIG. 4 illustrates a prior art nonadditive (NAM) video signal mixer.
Figure 5:
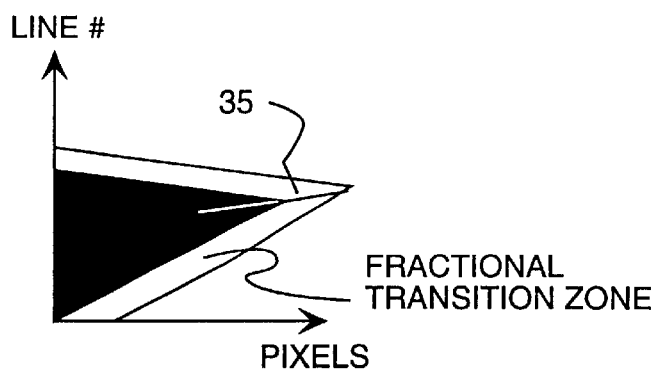
FIG. 5 illustrates the output of the prior art nonadditive mixer of FIG. 5 with the input signals of FIG. 1.
Figure 6:
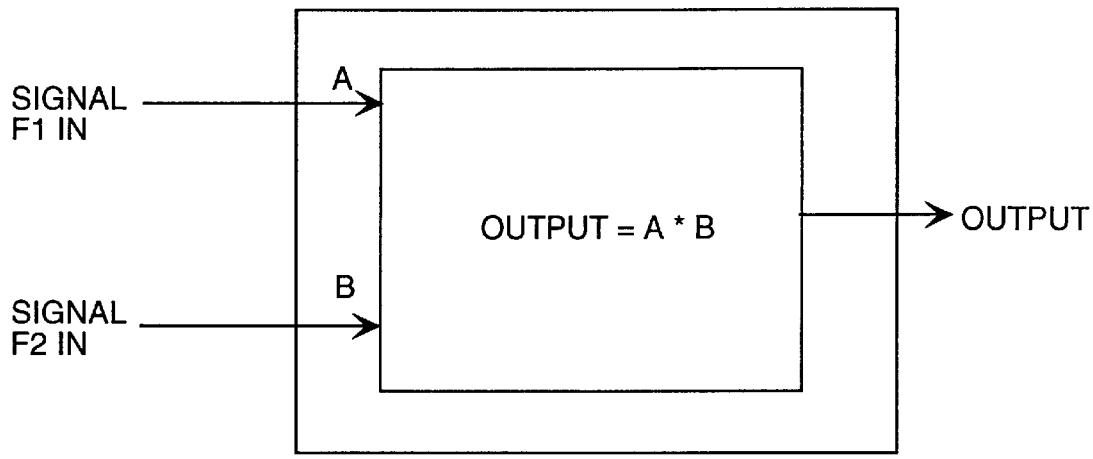
FIG. 6 illustrates a prior art multiplicative video signal mixer.
Figure 7:
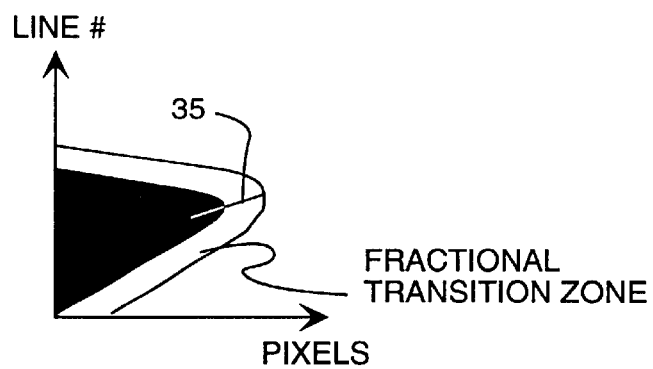
FIG. 7 illustrates the output of the prior art multiplicative mixer of FIG. 6 with the input signals of FIG.

The present invention is a parabolic video signal mixer that eliminate artifacts at boundaries of color correction regions. The invention may be embodied in any type of video signal processing system that requires the mixing of two independent video signal sources, and especially in situations when one or more signals includes a region of fractional transition for application of correction parameters. In particular, the invention may be embodied in a color correction system that implements scene-by-scene color manipulation of color correction regions of the video image isolated in the hue domain using hue, saturation, and luminance qualification or isolated with geometric regions. A particular system for use with the present invention is described in U.S. Pat. No. 09/282,400, filed Mar. 31, 1999 entitled "Primary Color Manipulation Using Secondary Color Correction Region Isolation", the disclosure of which is incorporated herein by reference and made a part hereof (hereinafter, the "Secondary Color Correction Region Isolation Application").

Alternatively, geometric regions or windows can be defined utilizing tools as described in U.S. Pat. No. 08/912,662, filed Aug. 18, 1997 entitled "User Definable Windows for Selecting Image Processing Regions," the disclosure of which is incorporated herein by reference and made a part hereof (hereinafter, the "User Definable Windows Application").

The invention is preferably implemented in digital logic and operates on digitized video signals. The invention may be implemented using programmable logic units (PLUs), field-programmable gate arrays (FPGAs) or other types of reprogrammable digital signal processing hardware. Details of the color correction systems in which the present invention is particularly operative are described in the referenced co-pending applications and will not be discussed further herein, except where necessary for a complete understanding of the invention.

As particularly described in the referenced Secondary Color Correction Region Isolation Application, to define color correction for a scene of a video image, or to define a color matte or key such as a blue screen, an operator first defines a scene and selects one of the frames of the scene as a target frame for manipulation. The image processing system includes a user interface that allows the operator to select hue sectors for isolation by placing a cursor on a desired location of the target frame.

For color isolation, the user interface displays the hue, saturation, and luminance of a sample of pixels under the cursor. The user interface also displays qualification curves about these hue, saturation, and luminance values. The operator may then adjust the qualification curves to define the shape and size of a hue sector that defines a color correction region. The qualification curves defined about such hue, saturation, and luminance values displayed on the user interface determine both the hue sector to receive color correction and a qualification ramp or curve establishing the percent of color correction to be applied over the hue sector, especially in transitions into and out of the hue sector.

The user interface allows the operator to select correction color values for each hue sector. The color correction equipment blends the color values of an input signal with corrected color values on a pixel-by-pixel basis through application of an alpha qualifier through an alpha mixer, which is a video signal mixer. The alpha qualifier reflects the product of the hue, saturation, and luminance qualifiers for a particular pixel's color value, where each qualifier is a point on a corresponding qualification curve. The final alpha qualifier may also reflect an additional alpha filter function or qualifier that further modifies the product of the hue, saturation, and luminance qualifiers. The final alpha qualification curve typically includes a full color correction zone around the hue, saturation, and luminance values of the sample of pixels under the cursor. In the full color correction zone, the color value of the output signal is equal to the corrected color value. That is, the input color value is completely replaced by the corrected color value for input color values that fall within the full color corrected zone.

The final alpha qualification curve also includes transition zones within the hue sector, but outside the full correction zone. In the transition zones, the alpha mixer uses the alpha qualification curve, represented by an alpha value ($\alpha$), to blend the input color values with the color corrected values set by the operator. For a given pixel in this transition zone, the output color value is computed as a weighted sum of the input color value and the corrected color value, where the alpha qualifier ($\alpha$) defines the weighting coefficients. The alpha mixer thus permits smoothing of the color correction, or a gradual reduction in the amount of color correction applied at the edges of the hue sector.

The same concept applies for geometric regions, by defining a gradual reduction in the amount of color correction applied at the edges or boundaries of a defined geometric region. As a result, the output color values typically include increasing amounts of input color values as the hue-domain color parameters (hue, saturation, and luminance) diverge from the hue-domain values of the sample of pixels under the cursor. Because the colorist may define the hue, saturation, and luminance qualifiers (e.g. $\alpha_H$, $\alpha_S$, $\alpha_Y$, respectively) independently, the blend at the edges of the hue sector may be based on hue, saturation or luminance, or a combination of these parameters. As noted previously, an additional alpha filter may further shape the final alpha qualifier applied by the mixer. The color correction equipment allows the operator to define qualifiers and color correction values for a plurality of non-overlapping hue sectors, which are also referred to as color correction channels.

As an additional option, the user interface may allow an operator to define one or more geometric constraints for each color correction channel, as described in the referenced User Definable Windows Application. For example, a geometric constraint may be a window that restricts the application of color correction for a corresponding hue sector to the portion of the frame inside, or alternatively outside, a geometrically defined window. Geometric constraints allow an operator to limit the automatic application of color correction to a defined portion of the video image, over several frames of a scene. Geometric constraints therefore increase a system's ability to isolate discrete objects in a video scene for color correction.

Once the operator is satisfied with the color correction defined for a target video image or frame, the color correction system automatically applies the color correction parameters defined for the target frame to the other frames of the scene. That is, the color correction system isolates color correction regions in each frame of the scene using the qualification curves and/or geometric regions defined for the target frame. The system mixes the corrected color values defined for the target frame with the input color values of each frame with the scene using the qualification curves defined for the target frame. It is in such a mixing operation that the problem described in the background hereof is most acute.

Specifically, a color correction system with which the present invention is useful applies the corrected color values to the isolated regions by mixing the input color values with the corrected color values on a pixel-by-pixel basis through application of an alpha qualifier ($\alpha$) in an alpha mixer. These steps are repeated for other scenes in the film or video tape, often with different color correction settings stored for different scenes. This process is repeated as needed to create a color corrected master film or video tape that reflects multiple color adjustments to multiple frames in multiple scenes.

Although the disclosed embodiment of the invention is described in the context of a scene-by-scene digital color correction system, those skilled in the art will understand that the invention is not limited to video signal color correction, but is equally useful in other types of image processing in which there is a need for region isolation, such as image compression, image filtering, noise suppression, animation, blue screen applications, and other image processing techniques. The invention is particularly useful in an image processing application in which there is a need to mix signals resulting from the definition of a first region of an image for receiving one type of data processing, and a second region for receiving a different type of data processing.

The disclosed embodiment, however, is described in conjunction with a scene-by-scene color correction system in which several frames defining a scene of a video program may receive automatic color corrections defined for a selected target frame of that scene. However, the disclosed embodiment is useful in any video signal application requiring video signal mixing, and is particularly useful in color correction or color enhancement systems for video programs, including motion pictures, television programs, video tape recordings, and the like.

Certain methods associated with the disclosed embodiment are presented in terms of exemplary display images, algorithms, and symbolic representations of operations of data within a computer memory or within a digital signal processing circuit. As known to those skilled in the programming arts, these are typical techniques used by those skilled in the art of computer programming and computer construction to convey teachings and discoveries to others skilled in the art. The description of the methods involved in the present invention include numerous details, such as computer display system elements, aspects of computer program user interfaces, display screens and formats, sample data, and so forth, in order to provide an understanding of the invention. Nevertheless, those skilled in the art will understand that the invention may be practiced without these specific details. In addition, well-known circuits, programming methodologies, and structures utilized in the present invention may not be described in detail to avoid obscuring the inventive aspects of the disclosed embodiments.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that may be stored, transferred, combined, compared, or otherwise manipulated. Those skilled in the art typically refer to these signals as bits, values, elements, symbols, characters, images, terms, numbers, or the like. It must be understood that no involvement of a human operator is necessary or even desirable in many aspects of the present invention, since the operations described (except those specifically identified as originating with the operator, user, or colorist) are machine operations performed in conjunction with a human operator that interacts with the computer.

Furthermore, it should be kept in mind that there is a distinction between the methods, steps, or operations carried out by a computer, and the method of computation itself. The present invention does not involve methods of computation. The invention rather relates to methods, steps, or operations for a computer processing electrical or other physical signals, generating desired physical signals, and displaying results and user interfaces.

It should be further understood that the operations described in this specification are not related or limited to any particular computer or apparatus. Rather, various types of general purpose or specialized machines may be used with programs constructed in accordance with invention. These machines may be general purpose digital computers, application-specific integrated circuits, parallel-processing hardware, neural networks, or other types computing devices. Nevertheless, it is considered advantageous to construct a specialized apparatus to perform the operations associated with the invention using parallel-processing circuitry, such as programmable logic units (PLUs), field-programmable gate arrays (FPGAs), or other types of reprogrammable parallel-processing hardware.

Figure 8:
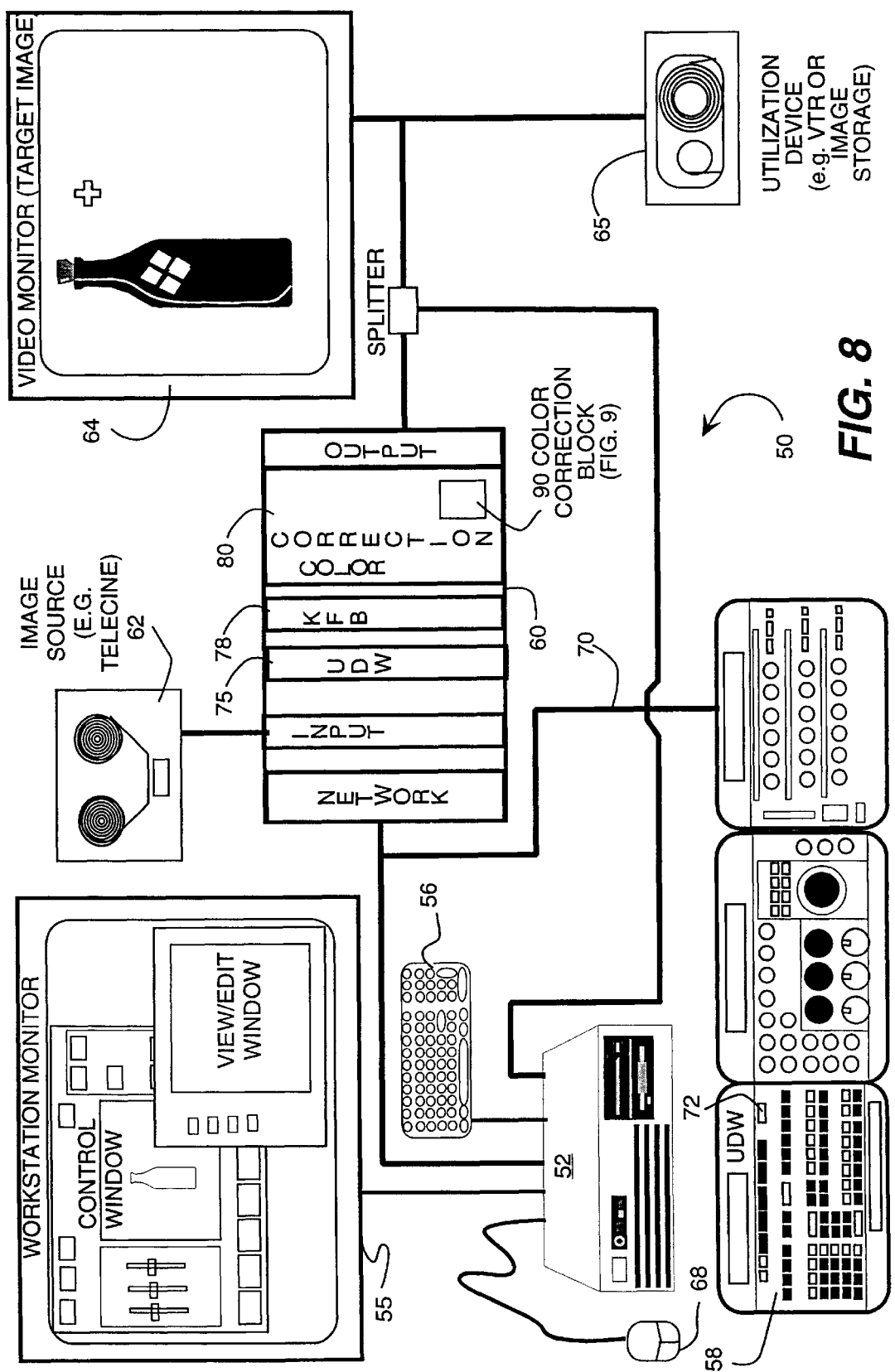
FIG. 8 is a schematic block diagram of a color correction system in which the present invention is operative.

Referring now again to the drawings, in which like numerals indicate like elements or steps throughout the several figures, FIG. 8 illustrates an image processing system 10 in which the present invention of a parabolic mixer is particularly useful.

Image Processing System

Referring now to the drawings, in which like numerals indicate like elements or steps throughout the several figures, FIG. 8 illustrates an image processing system 50 constructed in accordance with an illustrative embodiment of the present invention. The image processing system 50 is suitable for processing video data by carrying out primary color manipulation using secondary color correction region isolation, as more fully described in the referenced Secondary Color Correction Region Isolation Application. The image processing system 50 includes several basic components: a computer-based workstation 52 including monitor 55 and keyboard 56, a colorist's control panel 58, a digital color correction system 60, a source of video images 62, a video display or monitor 64, and a utilization device (e.g. computer storage medium) for storing processed images 65. The workstation 52 preferably includes pointing devices, such as a mouse 68 and/or similar user control devices such as a graphics tablet (not shown). The workstation 52 is coupled for data communications via a network connection 70, preferably a high speed network such as an Ethernet, to the color correction system control panel 58 and the color correction system 60.

The source of images 62 may be an analog source such as a telecine or video tape player, or the source may be a digital video storage medium. The source is connected to the color correction system 60, which converts analog input signals to digital signals if necessary. The image signals internal to the color correction system 60 are digital, and are stored and manipulated in a digital video format, such as the International Radio Consultant Committee (CCIR) promulgated Recommendation No. 601-1 (1986), which is incorporated into this specification by reference. The standard signals defined in Recommendation 601-1 essentially consist of a luminance signal Y and two color difference signals (R-Y) and (B-Y). It is well known that, since the luminance signal contains information on levels of red, green, and blue (R,G,B), the three standard 601-1 signals can be used to reproduce the R,G,B levels for any given set of samples.

The color correction system 60 converts the CCIR 601-1 signals to corresponding signals in the primary color domain (i.e., digital R,G,B signals). The color correction system 60 then manipulates the resultant signals in the primary color domain. The corrected or modified signal can then be passed through a signal matrix to convert the modified digital signal to an analog format suitable for storage on a medium, such as video tape, that may, in turn, be used to drive an analog display device, such as a television or other video display. The color correction system 60 also includes an output circuit that typically converts the digital signals within the color correction system into analog form for immediate display to the operator of the system. Thus, the output is coupled to the video monitor 64 and to the utilization device 65, such as a video tape recorder or other image storage device. Alternatively, the corrected digital signals can be stored in digital form in a digital data storage device coupled to the system.

The preferred workstation 52 is an INDY™ model workstation manufactured by Silicon Graphics, Inc. (SGI). Further details of the preferred workstation and configuration of the color correction system 60 are provided in the referenced Secondary Color Correction Region Isolation Application. The preferred color correction system 60 is a Da Vinci RENAISSANCE 8:8:8™ digital color corrector manufactured by Da Vinci Systems, Inc., Ft. Lauderdale, Fla. (assignee of the present application). This color correction system 60, which is coupled to the control panel 58, includes various circuit board components that carry out digital video signal processing.

The preferred RENAISSANCE 8:8:8™ control panel 58 includes several separate panels, each having a combination of dedicated keys, soft keys, and soft knobs that provide many simultaneous functions utilized in the color correction process. Included on the control panel 58 is a "User Definable Windows" (UDW) button or key 72 that is utilized to activate certain functions, such as those associated with defining geometric constraints. Details of the implementation of the user defined windows are provided in the referenced User Definable Windows Application.

The preferred color correction system 60 includes a user definable windows (UDW) generator circuit board 75 that includes a dedicated high speed microprocessor that converts vectorized user-defined windows into a video matte or geometric constraint on a real time basis at the real time event rate. A key frame buffer (KFB) circuit board 78 stores a video image from the image source 62, or from any other digital storage system, in a high speed memory. This image is then utilized in to derive a vector representation of any user defined windows. Keys for vectorizing may be obtained directly from the image source 62, or may be retrieved from prestored images stored in the memory of the workstation 52.

The preferred color correction system further includes color correction equipment 80 that carries out digital color correction and other video parameter adjustment functions associated with the color correction system 60. The preferred color correction equipment 80 is described in greater detail in the referenced Secondary Color Correction Region Isolation Application. The color correction equipment 80 includes at least one color correction block 90, which is described in more detail below and in connection with FIG. 9, for carrying out certain color correction functions.

Generally speaking, the color correction equipment 80 and color correction block 90 receives color correction parameters that define the coefficients of a transformation matrix or "T-matrix" that is applied to an input R,G,B, signal to produce a color corrected output R,G,B signal. The input R,G,B signal and R,G,B correction signals from processes internal to the color corrector are combined within an "alpha mixer" that restricts that application of the color corrections defined in by the color correction to selected regions defined in the hue-domain through hue, saturation, and luminance qualification curves, and to geometrically defined regions.

Thus, the preferred color correction system 60 is operative to receive video images from an image source 62 such as telecine, digitize the video images, capture a digitized image in the KFB board 78, display the captured image on the video monitor 64, receive color corrections entered by the colorist or operator via the control panel 58, impose these color corrections upon video images as they are transferred through the system via the color correction equipment 80, and provide corrected output signals for utilization or storage.

These output signals are employed or stored in the utilization device 65 and are simultaneously displayed on the video 10 monitor 64.

In carrying out the operations for applying image processing to an input video signal, a system operator or colorist interacts with the system through the control panel 58, and via the user interface elements of the workstation 52, including the keyboard 56, mouse 68, and workstation monitor 55. In particular, the workstation 52 executes computer programs for carrying out the computer-implemented methods described in the referenced applications, and generates displays on the workstation monitor 55 containing user interface elements such as informational displays, control buttons, slider bars, data entry fields, image display areas, etc.

The reader should be careful here to distinguish user-interface "windows" displayed on the monitor 5 5 generated from execution of computer software for carrying out the invention, from the "user-defined windows" for applying image processing. During system use, the workstation monitor 55 typically displays one or more user-interface windows for carrying out the methods as described in the referenced applications. During operation, user-interface windows are displayed which include various buttons and slider controls for manipulation of a key image.

Activation of certain commands causes the display of other, secondary windows.

Figure 9:
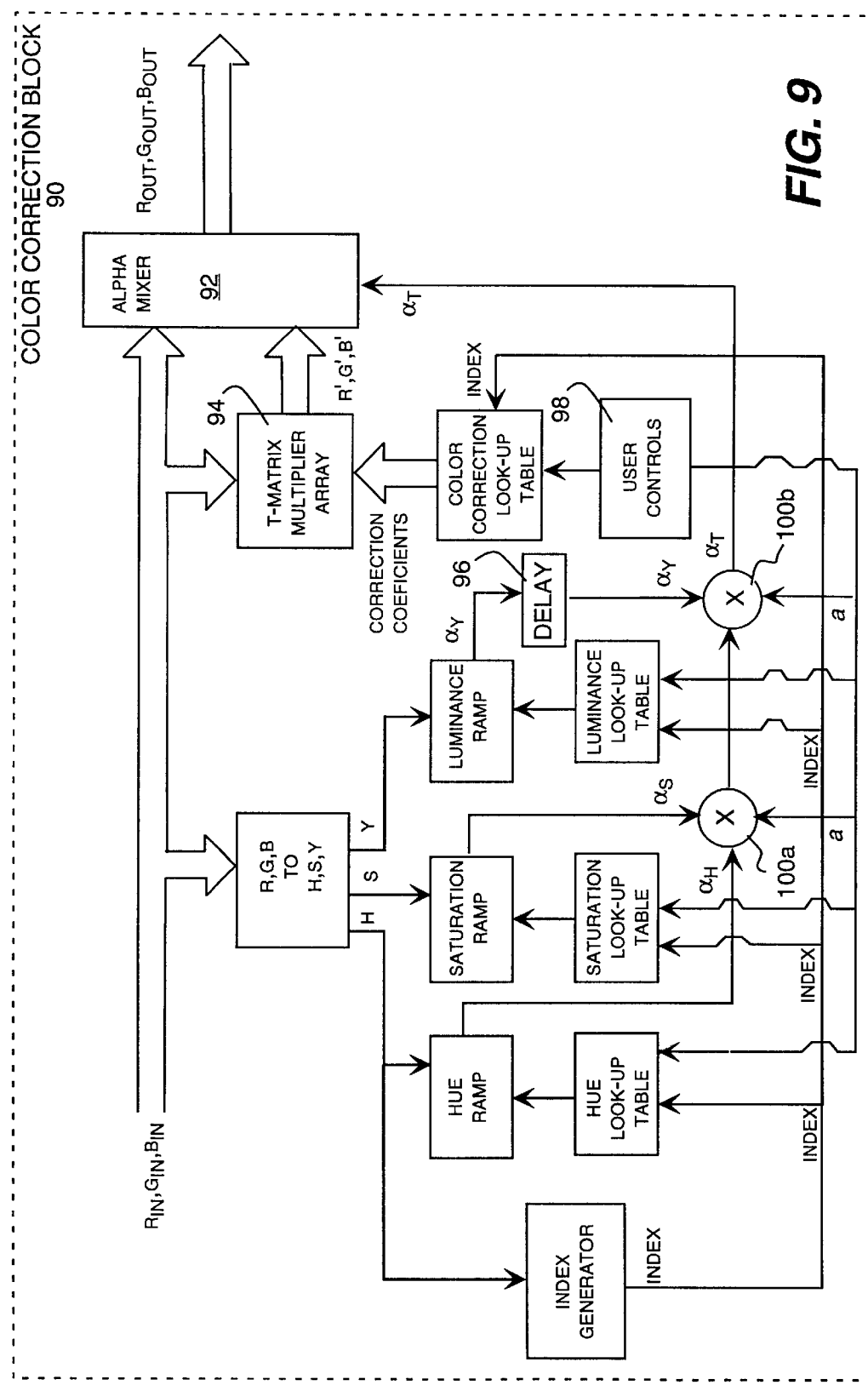
FIG. 9 is a schematic block diagram illustrating a color correction block which forms a component of the color correction equipment shown in FIG. 8.
Figure 10:
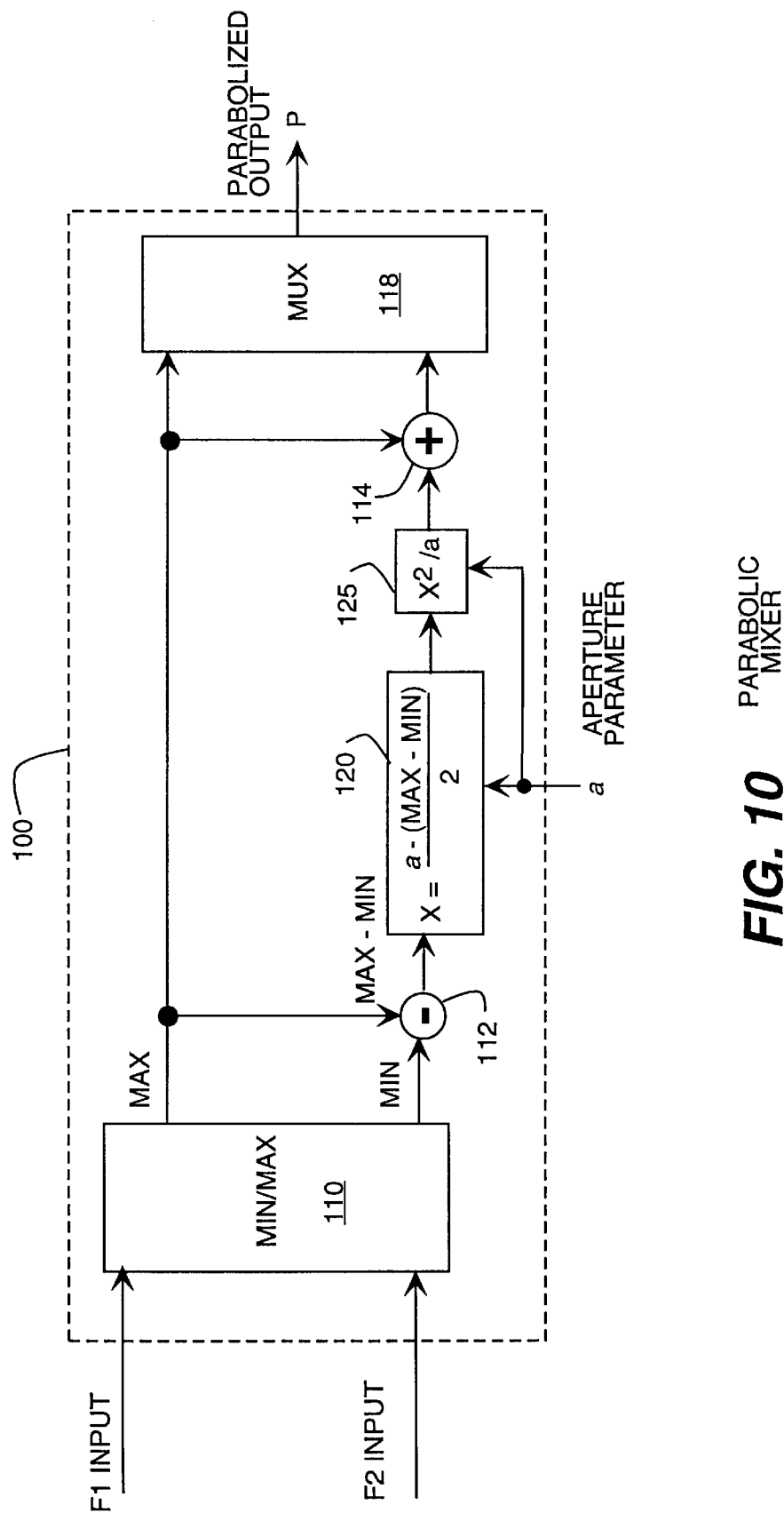
FIG. 10 is a block schematic diagram illustrating a parabolic mixer constructed in accordance with the preferred embodiment of the present invention.

FIG. 9 is a schematic block diagram of a representative color correction block 90 which is employed as a component of the color correction circuit 80 described in FIG. 8. The color correction block 90 includes a number of components, including mixers 100a, 100b each constructed in accordance with the present invention (e.g. as mixer 100 as shown in FIG. 10), and is constructed for the most part as described in the referenced U.S. Pat. No. 6,337,692 and will not be described further herein. However, there are certain significant differences between the color correction block described in the referenced patent and in the color correction block 90 with which the present invention is particularly suitable for inclusion.

Generally, the color correction block 90 includes an alpha mixer 92 that receives color input values $R_{IN}$, $G_{IN}$, $B_{IN}$, the unqualified corrected color values R', G', B' from a T-matrix multiplier array 94, and an alpha qualifier $\alpha_T$ representing a composite qualifier value from mixers 100a, 100b, and then computes output color values $R_{OUT}$, $G_{OUT}$, $B_{OUT}$ as a weighted sum of the input color values and the unqualified corrected color values, where the alpha qualifier $\alpha_T$ defines a weighting parameter. The alpha mixer 92, T-matrix multiplier array 94, and other primary components in FIG. 9 (with the exception of the mixers 100a, 100b) are constructed as described in the referenced U.S. Pat. No. 6,337,692 and will not be described further herein.

The mixers 100a, 100b are each constructed in accordance with the preferred embodiment of the present invention, as more particularly described below in connection with FIG. 10. The mixer 100a mixes a hue alpha qualifier $\alpha_H$ with a saturation alpha qualifier $\alpha_S$ to obtain an interim alpha qualifier, which is mixed with a delayed luminance qualifier $\alpha_Y$ at mixer 100b to obtain a composite qualifier $\alpha_T$ which is provided to the alpha mixer 92. A delay circuit 96 delays the luminance qualifier $\alpha_Y$ prior to provision to the mixer 100b so as to compensate for processing delays that occur in the mixer stage 100a.

A user controllable aperture parameter a is provided to each mixer 100a, 100b from a user controls block 98, and allows a degree of operator control over the degree of parabolization effected by the mixers.

The other circuits shown in FIG. 9, e.g. hue ramp, saturation ramp, luminance, ramp, index generator, hue look up table, saturation look up table, luminance look up table, color correction look up table, users controls, RGB to HSY matrix, etc. are the same as described in the referenced copending application, and operate as described therein.

It will be noted that the color correction block 90 in FIG. 9 differs from the color correction block described in the referenced Secondary Color Correction Region Isolation Application in that no separate alpha filter is provided or required, in that the mixers 100a, 100b effect the desired alpha qualifier mixing function without the need for separate filtering.

Video Signal Mixer

Turning now to FIG. 10, a parabolic mixer circuit 100 constructed in accordance with the preferred embodiment of the present invention receives two input signals designated F1 and F2, receives a parameter $\alpha$ which is designated an "aperture" signal, and provides an output signal P which comprises a mixing of the signals F1 and F2 based on a parabolic function. This circuit 100 implements a system of equations which fits a parabola between the two independent input signals F1 and F2 in a region defined by the parameter $\alpha$. The aperture parameter a is specified by the user to control the mixer output.

The follow equations are implemented in the circuitry of the mixer 100:

$$F_{MAX} := \begin{vmatrix} F1 & \text{if } F1 > F2 \\ F2 & \text{otherwise} \end{vmatrix} \quad F_{MIN} := \begin{vmatrix} F2 & \text{if } F1 > F2 \\ F1 & \text{otherwise} \end{vmatrix}$$

$$\chi := \frac{a - (F_{MAX} - F_{MIN})}{2}$$

$$P := \begin{vmatrix} F_{MAX} + \frac{(\chi)^2}{a} & \text{if } \chi > 0 \\ F_{MAX} & \text{otherwise} \end{vmatrix}$$

To implement these equations in digital computational circuitry, it is best to consider the equations in functional stages or components. A first stage comprises a MIN/MAX stage 110 which receives the input signals F1 and F2 and is operative for determining the minimum and maximum values of F1 or F2. The output signal MAX comprises the larger of F1 or F2 and corresponds to the value of $F_{MAX}$ in the equations above, while the output MIN comprises the smaller of F1 or F2 and corresponds to the value $F_{MIN}$ in the equations above. The MAX signal is provided to three separate circuits for utilization: a subtractor 112, an adder 114, and a multiplexer or MUX 118.

The subtractor 112 computes the difference between the MAX and MIN values and obtains a difference signal ($F_{MAX}-F_{MIN}$) which is utilized in further calculations. The difference signal is provided to an aperture utilization circuit 120. The aperture utilization circuit 120 receives the aperture parameter $\alpha$ and computes the function of a $\alpha-(F_{MAX}-F_{MIN})$ divided by 2. The output of the aperture utilization circuit 120 is then squared by a squaring circuit 125 and divided by the aperture parameter $\alpha$. The squaring circuit effectively computes a parabola according to known mathematics, so as to generate a parabolized output signal.

The output of the squaring circuit 125 is provided to the adder circuit 114 where it is added with the MAX signal and provided as one input to the multiplexer 118. The multiplexer then selects either (a) the maximum value MAX or (b) the sum of the maximum value plus the square of the output of the squaring circuit, provided that the output is greater than zero. The output of the multiplexer is the output of the mixer, designated as the value P.

Figure 11:
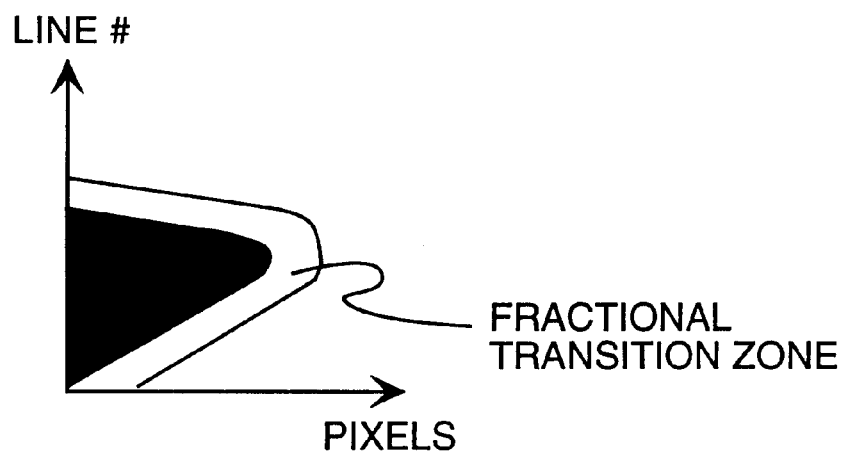
FIG. 11 illustrates the result of mixing the video signals shown in FIG. 1 with the parabolic mixer constructed as described herein.

The output of this mixing circuit for the example shown in FIG. 1 is as shown in FIG. 11. It will be appreciated that the application of the parabolized function to the two input signals results in the smooth transition in the transition regions defined in the two mattes.

Figure 12:
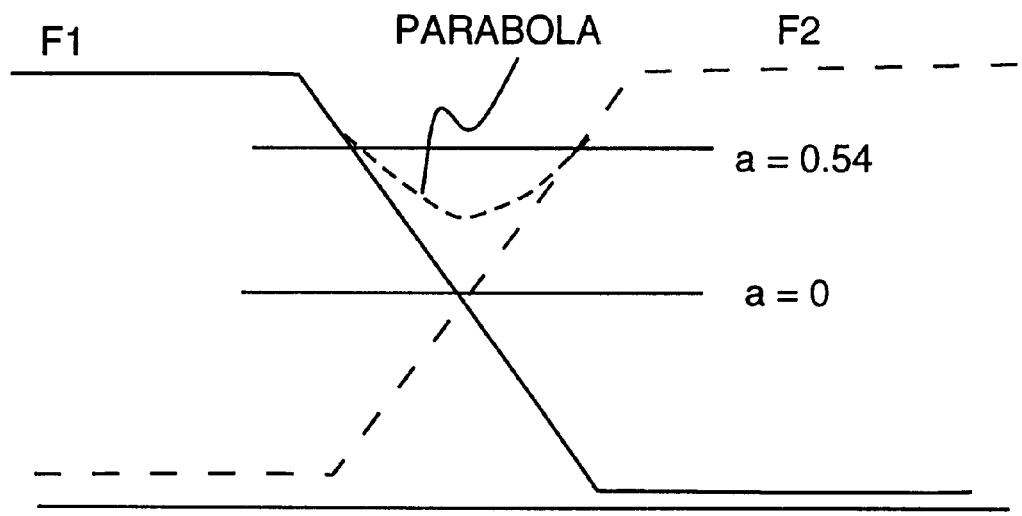
FIG. 12 graphically illustrates the parabolic function that is employed in a parabolic mixer constructed in accordance with the present invention.

FIG. 12 illustrates in graphical form the fitting of a parabolic curve to the two input signals F1 and F2, in accordance with the invention. Intuitively, the aperture parameter a is a number that varies between zero and one and reflects operator control of the parabola that is fitted between the two signals F1 and F2. It has been empirically determined that a satisfactory value for the aperture a is approximately 0.5 to 0.6, and a value of 0.54 has been found to generate excellent results. This is approximately half way between the minimum and maximum value for the mixture of the signal and results in the fitting of a suitable parabola for the transition between values of F1 to values of F2 for the mixing process.

If the aperture a is set to zero, there is a hard comparison between the values of F1 and F2 and the mixer operates much in the manner of a conventional non-additive mixer. On the other hand, with increasing values of the aperture, for example 0.1, as the signals approach within ten percent of each other's value, then a noticeable parabola is fitted between the two. Likewise, for an aperture of 0.2, when the signals of F1 and F2 are within the range of 20 percent of each other, and there is a fade between the two signals based on the parabolic function. This results in a smooth transition as opposed to a "hard switch" which occurs in a non-additive mixer. It will thus be appreciated that for small values of the aperture parameter a, there is a fairly sharp transition between F1 and F2, but for large values of a, there may be little curvature or transition between value of F1 and F2.

It will be appreciated that the foregoing circuit components carry out a method for mixing a first video signal with a second video signal to provide a parabolized output signal while smoothly controlling the rate of change of the output signal. The disclosed method comprises the steps of detecting the maximum value of the first video signal or the second video signal, detecting the minimum value of the first video signal or the second video signal, and then determining a difference between the maximum value of the first video signal or the second video signal and the minimum value of the first video signal or the second video signal and providing a first difference signal.

The method further includes steps of receiving an aperture signal for varying the mixer output, and determining the difference between the aperture signal and the first difference signal to provide an aperture varied signal. The aperture varied signal is then squared, and added to the maximum value of either the first video signal or the second video signal. Finally, the method includes the step of selecting either the maximum value of the first video signal or the second video signal or the output of the adding step, to provide the parabolized output signal.

This method may be implemented with dedicated digital signal processing circuitry, which is preferred for speed of operation, but may also be implemented with software in a general purpose computing device for applications that may not require real time or near real time signal viewing and manipulation. Thus, software, hardware, and firmware methods for carrying out the invention are considered equivalent.

In accordance with the foregoing, the present invention implements a parabolic curve fitting between two independent video signals and provides for a smooth transition when mixing two independent video signal sources. In view of the foregoing description of the preferred embodiment of the invention, other embodiments will suggest themselves to those skilled in the art. Therefore, the scope of the present invention is to be limited only by the claims set forth below.

What is claimed is:

1. A signal mixer for mixing a first video signal with a second video signal while smoothly controlling the rate of change for an output signal, comprising:
    an input stage for receiving the first video signal and the second video signal;
    a mixing circuit for mixing the first video signal with the second video signal based on a predetermined parabolic function between said first video signal and said second video signal; and
    an output stage coupled to said mixing circuit for providing an output signal.

2. The signal mixer of claim 1, wherein the mixing circuit comprises an aperture signal circuit for modifying the parabolic function as a function of an aperture signal.

3. The signal mixer of claim 1, wherein the mixing circuit comprises:
    a maximum signal detector for detecting the maximum value of the first video signal or the second video signal;
    a minimum signal detector for detecting the minimum value of the first video signal or the second video signal;
    a circuit for providing a difference signal comprising the difference between the maximum value of the first video signal or the second video signal and the minimum value of the first video signal or the second video signal;
    an aperture circuit responsive to an aperture signal and to the difference signal for providing an aperture varied signal for varying the output signal corresponding to the value of the aperture signal;
    a multiplier circuit for squaring the aperture varied signal;
    an adder circuit for adding the squared aperture varied signal to the maximum value of the first video signal or the second video signal.

4. The signal mixer of claim 3, wherein the output stage comprises:
    an output multiplexer for selecting either the maximum value of the first video signal or the second video signal or the output of the adder circuit to provide said output signal.

5. A signal mixer for mixing a first video signal with a second video signal to produce an output signal while smoothly controlling the rate of change of an output signal, comprising:
    a maximum signal detector for detecting the maximum value of the first video signal or the second video signal;
    a minimum signal detector for detecting the minimum value of the first video signal or the second video signal;
    a circuit for providing a difference signal comprising the difference between the maximum value of the first video signal or the second video signal and the minimum value of the first video signal or the second video signal;
    an aperture circuit responsive to an aperture signal and to the difference signal for providing an aperture varied signal for varying the output signal corresponding to the value of the aperture signal;

a multiplier circuit for squaring the aperture varied signal;

an adder circuit for adding the squared aperture varied signal to the maximum value of the first video signal or the second video signal; and an output multiplexer for selecting either the maximum value of the first video signal or the second video signal or the output of the adder circuit to provide a parabolized output signal.

6. The signal mixer of claim 5, wherein the aperture circuit provides an interim signal comprising the difference between the aperture signal and the difference signal, divided by two, and the multiplier is responsive for squaring the interim signal.

7. The signal mixer of claim 5, wherein the aperture signal varies between zero and one.

8. A method for mixing a first video signal with a second video signal to provide a parabolized output signal while smoothly controlling the rate of change of the output signal, comprising the steps of:

detecting the maximum value of the first video signal or the second video signal;

detecting the minimum value of the first video signal or the second video signal;

determining a difference between the maximum value of the first video signal or the second video signal and the minimum value of the first video signal or the second video signal and providing a first difference signal;

receiving an aperture signal;

determining the difference between the aperture signal and the first difference signal to provide an aperture varied signal;

squaring the aperture varied signal;

adding the squared aperture varied signal to the maximum value of either the first video signal or the second video signal; and selecting either the maximum value of the first video signal or the second video signal or the output of the adding step, to provide the parabolized output signal.

9. In a video signal color correction system operative for scene-by-scene color corrections, including color correction circuit components for applying color corrections to an input video signal, and circuit components for providing a qualification function for selectively applying color corrections to the input video signal as a function of qualifier parameters, said qualifier parameters operative for applying fractional degrees of color correction at fractional boundaries of qualification regions, the improvement comprising:

a parabolic mixer for mixing video signals including the plurality of qualifier parameters with a parabolic function so as to eliminate discontinuities in regions of the signal which would otherwise produce discontinuities from mixing of the video signals.

10. The improvement of claim 9, wherein the qualifier parameters are selected from the group comprising hue qualification, saturation qualification, and luminance qualification.

11. The improvement of claim 9, wherein the qualifier parameter is a user definable window qualifier.

12. A signal mixer for mixing a first video signal with a second video signal while smoothly controlling the rate of change of an output signal, comprising:

an input stage for receiving the first video signal and the second video signal;

a mixing circuit for mixing the first video signal with the second video signal based on a predetermined parabolic function, wherein the mixing circuit comprises, an aperture signal circuit for modifying the parabolic function as a function of an aperture signal; and an output stage for providing a parabolized output signal.

13. The signal mixer of claim 12, wherein the mixing circuit comprises:

a maximum signal detector for detecting the maximum value of the first video signal or the second video signal;

a minimum signal detector for detecting the minimum value of the first video signal or the second video signal;

a circuit for providing a difference signal comprising the difference between the maximum value of the first video signal or the second video signal and the minimum value of the first video signal or the second video signal;

the aperture signal circuit responsive to the aperture signal and to the difference signal for providing an aperture varied signal for varying the output signal corresponding to the value of the aperture signal;

a multiplier circuit for squaring the aperture varied signal;

an adder circuit for adding the squared aperture varied signal to the maximum value of the first video signal or the second video signal.

14. The signal mixer of claim 13, wherein the output stage comprises:

an output multiplexer for selecting either the maximum value of the first video signal or the second video signal or the output of the adder circuit to provide a parabolized output signal.

* * * * *

UNITED STATES PATENT AND TRADEMARK OFFICE
CERTIFICATE OF CORRECTION

PATENT NO.    : 6,469,747 B1
DATED         : October 22, 2002
INVENTOR(S)   : Rai et al.

It is certified that error appears in the above-identified patent and that said Letters Patent is hereby corrected as shown below:

<u>Title page,</u>
Item [73], please correct the Assignee to read -- Da Vinci Systems, Inc. -- instead of "Da Vinco Systems, Inc."

Signed and Sealed this

Eighteenth Day of March, 2003

JAMES E. ROGAN
*Director of the United States Patent and Trademark Office*